Aug. 20, 1957    F. B. PARSONS    2,803,310
MOISTURE SEPARATOR
Filed May 10, 1955
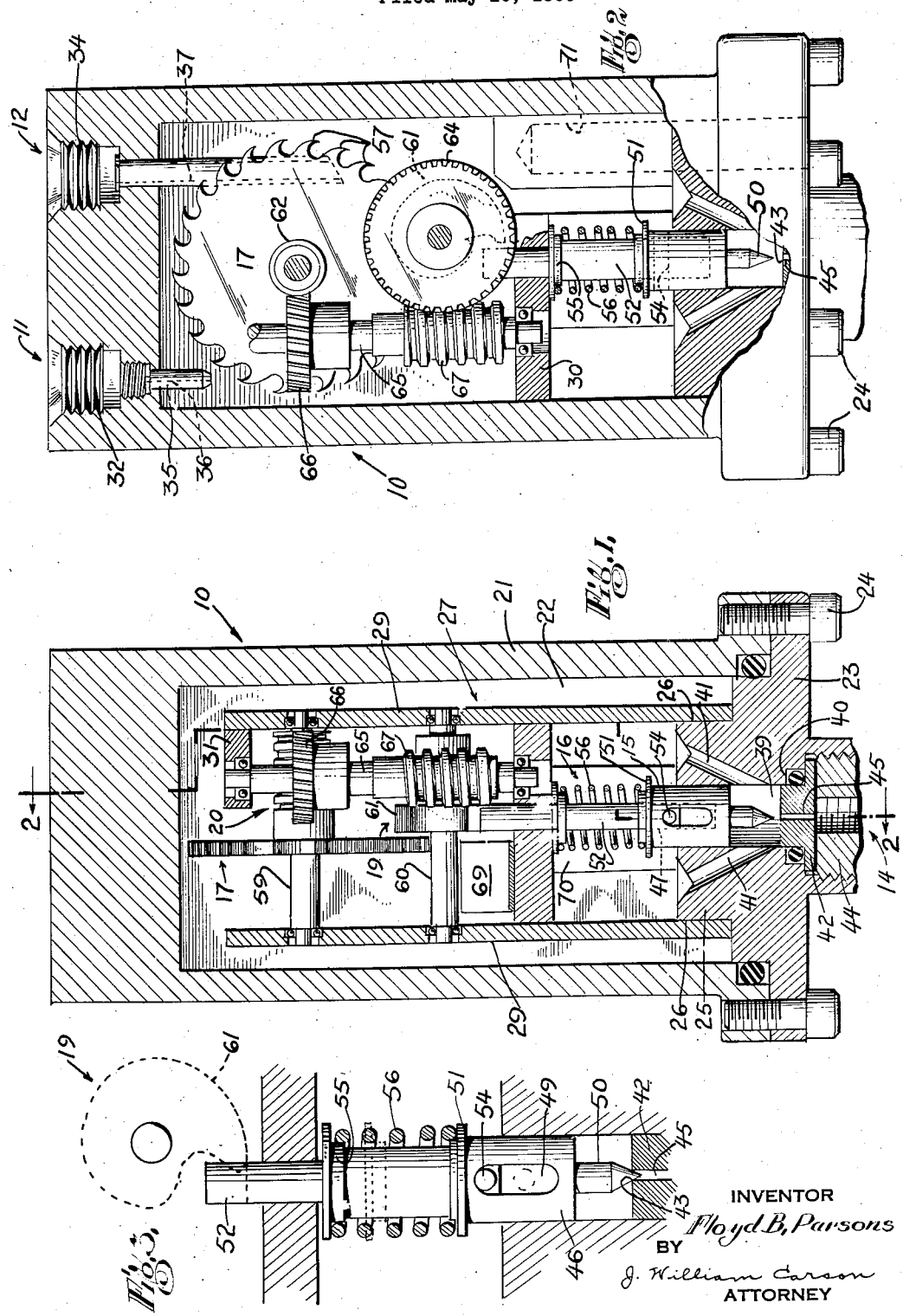
INVENTOR
Floyd B. Parsons
BY
J. William Carson
ATTORNEY

United States Patent Office

2,803,310
Patented Aug. 20, 1957

2,803,310

MOISTURE SEPARATOR

Floyd B. Parsons, Ridgewood, N. J., assignor to Specialties Development Corporation, Belleville, N. J., a corporation of New Jersey Application May 10, 1955, Serial No. 507,430

9 Claims. (Cl. 183—42)

This invention relates to moisture separators for separating moisture from pressurized gas, and, more particularly, to such separators having valved drainage outlets which are automatically controlled by the flow of fluid from which moisture is separated.

Heretofore, moisture separators have been proposed for use in aircraft pneumatic compressor systems designed to operate at pressures on the order of 3000 pounds per square inch, at below freezing temperatures, for example, wherein the moisture was separated and trapped in a chamber while the compressor was in operation and a valve at the bottom of the chamber was automatically opened to discharge the accumulated moisture to atmosphere upon shutting down or unloading of the compressor. While such separators were satisfactory in systems wherein the compressor was operated only for short periods of time or at above freezing temperatures, the incorporation of additional pneumatically operated apparatus in aircraft has necessitated operation of the compressors for longer periods of time during which the moisture was not discharged but accumulated until the separator was overloaded, whereupon some of the moisture was carried out of the separator through the dry air outlet thereby nullifying the effectiveness of the separator. Thus, if the craft was subjected to below freezing temperatures, such as would be encountered at high altitudes, the excess moisture was likely to freeze in the separator dry air outlet lines to obstruct the same. Such obstruction at pressures on the order aforementioned create extremely dangerous conditions.

Accordingly, an object of the present invention is to provide a moisture separator which overcomes the foregoing difficulties and disadvantages.

Another object is to provide such a separator having a valved drainage outlet which is automatically controlled by the flow of fluid from which moisture is separated.

Another object is to provide such a separator which operates to periodically discharge accumulated moisture while the compressor is in operation.

A further object is to provide such a separator which is adapted for low temperature operation.

A still further object is to provide such a separator which is simple and practical in construction, reliable in operation, and is readily manufactured and assembled in an economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a moisture separator comprising a casing having an inlet nozzle for compressed gas from which moisture is to be removed, an outlet for the gas from which moisture has been removed, and a drainage outlet for removing condensed moisture, a valve for the drainage outlet, means for normally causing the valve to close the drainage outlet, and means for periodically rendering the last mentioned means ineffective including timing means and being driven directly by the compressed gas passing through the inlet nozzle.

A preferred embodiment of the invention has been chosen for purposes of illustration and description, and is shown in the accompanying drawing, forming a part of the specification, wherein:

Fig. 1 is a longitudinal sectional view of a moisture separator embodying the present invention shown with the drainage valve unseated.

Fig. 2 is a sectional view taken substantially along the line 2—2 on Fig. 1.

Fig. 3 is a detail view illustrating portions of the valving mechanism in their respective positions when the drainage valve is seated, and illustrating the same in broken lines in their respective positions just prior to unseating of the drainage valve.

Referring to the drawing in detail, and more particularly to Figs. 1 and 2 thereof, there is shown a casing 10 having an inlet 11 for compressed gas from which moisture is to be removed, an outlet 12 for the gas from which moisture has been removed, and a drainage outlet 14 for removing condensed moisture; a valve assembly 15 for the drainage outlet; valve controlling means 16 for normally causing the valve to close the drainage outlet; means 17 in the casing adapted to be driven by the fluid entering the casing through the inlet 11; a cam member 19 adapted to periodically render the valve controlling means ineffective; and a gear train 20 in driven connection with the means 17 and in driving connection with the cam member 19.

The casing 10 includes a cylindrical member 21 having a chamber or bore 22 therein open at one end thereof; and a closure member 23 adapted to be secured to the open end of the cylindrical member by bolts 24 to seal the same.

The inner face of the closure member 23 is formed with a boss 25 having parallel sides 26 for mounting a frame 27 which includes a pair of spaced apart upright members 29, a cross-piece 30 connecting the members 29 at the middle thereof, and a bearing mount 31 on one of the frame members at its free end.

As shown in Fig. 2, the inlet 11 and the outlet 12 comprise stepped bores 32 and 34, respectively, in the closed end of the cylindrical member 21. Each of the bores 32 and 34 is threaded at its enlarged end for the reception of suitable fluid carrying conduits (not shown). The inlet bore 32 is also threaded at its reduced end for reception of an elongate nozzle 35 depending into the cylindrical member and being formed with a longitudinal bore 36 of relatively small diameter. A tubular member 37 is suitably mounted in the outlet 12 and depends through the reduced portion of the bore 34 and into the casing 10. The inlet and outlet are preferably disposed adjacent the casing side wall and diametrically opposite each other with respect to the cylindrical member 21.

The drainage outlet 14 includes a centrally located stepped bore 39 extending through the closure member 23 to provide a downwardly facing shoulder 40, and a plurality of drainage ports 41 extending in a radial direction from the face of the boss 25 of the closure member into the bore 39 just above the shoulder 40. A disc 42 is mounted in the stepped bore 39 and a collar member 44 is screw threaded into the enlarged portion of the bore to secure the disc in abutment with the shoulder 40. The disc 42 is formed with a central boss extending into the bore 39 which has an orifice 45 of relatively small diameter providing a valve seat 43, for the purpose to be described.

The valve assembly 15 includes a cylindrical body section 46 slidably disposed in the bore 39 formed with an axial bore 47 and longitudinal slots 49 at opposite sides thereof communicating with the bore 47; and a valve member 50, depending from the body section and having a conical surface for normally engaging the disc 42 and closing the bore 45 thereof, as shown in Fig. 3. The cylindrical body section 46 has an annular external flange 51 surrounding the upper portion thereof.

The valve controlling means 16 comprises a rod or plunger 52, one end of which extends through a suitable guide opening in the cross-piece 30 and the other end of which is disposed within the bore 47 of the cylindrical body section for slidable longitudinal movement therein. A cross-pin 54 extends radially outwardly from the latter end of the plunger 52 and has its outer portions disposed in the slots 49. A flange or collar 55 is secured to the plunger below the cross-piece 30 and serves to limit the movement of the plunger in a direction away from the closure member 23 and serves as an abutment for one end of a helical spring 56 which surrounds the rod and bears against the flange 51 at its other end.

The means 17 in the casing adapted to be driven by the fluid entering the casing through the inlet 11 is illustrated herein as a turbine wheel having a plurality of circumferentially spaced vanes 57. The turbine wheel is mounted for rotation on a shaft 59 supported in suitable bearings in the frame members 29 with its vanes 57 closely adjacent the discharge end of the nozzle 35 whereby the gas from which moisture is to be separated drives the turbine wheel.

The cam member 19 is secured to a shaft 60 parallel to the shaft 59 and is rotatably supported in suitable bearings in the frame members 29. The cam member is formed with a generally spiral, uniform motion, single stepped cam surface 61 adapted to engage the upper end of the plunger 52.

The gear train 20 comprises a worm gear 62 secured to the shaft 59, a worm wheel 64 secured to the shaft 60, a worm gear 66 driven by the worm gear 62 and secured on a vertical shaft 65 rotatably supported by bearings in the cross-piece 30 and the bearing mount 31, and a worm gear 67 secured to the shaft 65 for driving the worm wheel 64.

In operation, pressurized gas, such as atmospheric air from which moisture is to be separated, is delivered by a suitable conduit (not shown) to the inlet 11 and the nozzle 35. The gas is expanded as it passes through the nozzle and is directed to impinge upon the turbine vanes 57 to effect rotation of the turbine wheel 17, the shaft 59 and the worm gear 62 in a counter clockwise direction, as viewed in Fig. 2. Such rotary motion is transmitted through the gear train 20 to the cam member 19 which also rotates in a counter clockwise direction, as indicated.

Simultaneously, the gas is subjected to considerable turbulence in the casing which, in combination with the cooling effect of the expansion through the nozzle, causes the moisture carried by the gas to condense and fall to the bottom of the casing where it accumulates in the drain ports 41 and the bore 39. Sufficient moisture may condense to fill the bore 39 above the disc 42, and the drain ports, whereupon accumulation will continue in the casing. Gas from which moisture has been removed leaves the casing through the tubular member 37, the outlet 12, and a suitable conduit (not shown) connected thereto.

As shown in Fig. 3, rotation of the cam member 19 causes the cam surface 61 to gradually depress the plunger 52, against the influence of the spring 56, until the cam surface step passes the upper end of the plunger, the spring and the pressure in the casing serving to maintain the conical surface of the projection 50 in sealed engagement with the seat 43. As this occurs, the spring, compressed between the flange 51 and the flanged collar 55, expands to drive the plunger in a direction away from the drainage conduit. The sudden upward movement of the plunger causes the pin 54 to engage the upper end of the slots 49 to move the valve assembly in the same direction, thereby unseating the conical surface of the projection 50 from the disc 42 to unclose the bore 45.

As soon as the bore 45 is unclosed, the pressure in the casing is effective to drive the accumulated moisture therethrough so that it may be carried off through a suitable conduit (not shown) secured to the collar member 44.

The dynamic force of the fluid passing through the bore 45 under a pressure of the order of 3000 pounds per square inch acts to draw the valve assembly towards the disc 42 to seat the same and close the bore as soon as the effect of the spring is dissipated, so that the bore 45 remains unclosed for only a fraction of a second and any loss of gas through the drainage outlet is negligible. The frequency of operations of the valve assembly is governed by the velocity of the gas as it enters the casing through the nozzle 35 and the gear ratio in the gear train 20. With incoming gas at a pressure of about 3000 pounds per square inch, operation of the valve assembly once every minute has been found satisfactory when separating moisture from atmospheric air in aircraft pneumatic systems.

If desired, a baffle plate 69 (Fig. 1) may be mounted on the upper surface of the cross-piece 30 to extend upwardly to a zone adjacent the shaft 60 and below the turbine wheel 17 to increase the turbulence of the moist gas in the casing, thereby inducing moisture to condense on its surface.

In order to prevent the moisture in the separator from freezing, the closure member 23 may be formed with a projection 70 extending into the casing and with a bore 71 extending from the exterior of the closure member and into the projection for the reception of a conventional heating coil.

From the foregoing description, it will be seen that the present invention provides a moisture separator having a valved drainage outlet which is automatically controlled by the current of fluid from which moisture is to be separated. It will also be seen that the separator may be used in a pneumatic compressor system adapted for below freezing operation to periodically discharge accumulated moisture while the compressor is in operation and that the separator is simple and practical in construction, reliable in operation and is readily manufactured and assembled in an economical manner.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A moisture separator of the class described comprising a casing having an inlet nozzle for compressed gas from which moisture is to be removed, an outlet for the gas from which moisture has been removed and a drainage outlet for the removed moisture, a valve for said drainage outlet, means for normally causing said valve to close said drainage outlet, and means for periodically rendering said last mentioned means ineffective including timing means and being driven directly by the compressed gas passing through said inlet nozzle.

2. A moisture separator of the class described comprising a casing having an inlet nozzle for compressed gas from which moisture is to be removed, an outlet for the gas from which moisture has been removed and a drainage outlet for the removed moisture, a valve for said drainage outlet, means for normally causing said valve to close said drainage outlet, and means for periodically rendering said last mentioned means ineffective including a gear train and being driven directly by the compressed gas passing through said inlet nozzle.

3. A moisture separator of the class described comprising a casing having an inlet nozzle for compressed gas from which moisture is to be removed, an outlet for the gas from which moisture has been removed and a drainage outlet for the removed moisture, a valve for said drainage outlet, means including a cam member for normally causing said valve to close said drainage outlet, and means for periodically rendering said last mentioned means ineffective including timing means and being driven directly by the compressed gas passing through said inlet nozzle.

4. A moisture separator of the class described comprising a casing having an inlet nozzle for compressed gas from which moisture is to be removed, an outlet for the gas from which moisture has been removed and a drainage outlet for the removed moisture, a valve for said drainage outlet, means including a cam member for normally causing said valve to close said drainage outlet, and means for periodically rendering said last mentioned means ineffective including a gear train and being driven directly by the compressed gas passing through said inlet nozzle and in driving connection with said cam member.

5. A moisture separator of the class described comprising a casing having an inlet for compressed gas from which moisture is to be removed, an outlet for the gas from which moisture has been removed and a drainage outlet for the removed moisture, nozzle means in said inlet for directing a stream of said gas from which moisture is to be removed into said casing, a valve for said drainage outlet, means for normally causing said valve to close said drainage outlet, and means for periodically rendering said last mentioned means ineffective including a turbine wheel adjacent said inlet and driven directly by the compressed gas passing through said inlet nozzle means.

6. A moisture separator of the class described comprising a casing having an inlet for compressed gas from which moisture is to be removed, an outlet for the gas from which moisture has been removed and a drainage outlet for the removed moisture, nozzle means in said inlet for directing a stream of said gas from which moisture is to be removed into said casing, a valve for said drainage outlet, means including a cam member for normally causing said valve to close said drainage outlet, and means for periodically rendering said last mentioned means ineffective including a turbine wheel adjacent said inlet and driven directly by the compressed gas passing through said inlet nozzle means and in driving connection with said cam member.

7. A moisture separator of the class described comprising a casing having an inlet nozzle for compressed gas from which moisture is to be removed; an outlet for the gas from which moisture has been removed and a drainage outlet for the removed moisture; a valve for said drainage outlet; means for normally causing said valve to close said drainage outlet including a plunger mounted for longitudinal movement in said casing, a cam member for urging said plunger in a direction towards said drainage outlet, a valve member slidably mounted with respect to said plunger, and a spring for resisting movement of said plunger in a direction towards said drainage outlet; and means for periodically rendering said last mentioned means ineffective including timing means driven by the compressed gas passing through said inlet; said plunger having means effective to unseat said valve member when said closing means is rendered ineffective.

8. A moisture separator of the class described comprising a casing having an inlet for compressed gas from which moisture is to be removed; an outlet for the gas from which moisture has been removed and a drainage outlet for the removed moisture; a valve for said drainage outlet; means for normally causing said valve to close said drainage outlet including a plunger mounted for longitudinal movement in said casing, a cam member adapted to engage one end of said plunger and urge the same in a direction towards said drainage outlet, a valve member formed with a cylindrical section having a slot therein for slidably receiving the other end of said plunger, and a helical spring surrounding said plunger and bearing against the same at one end and against said cylindrical section at the other end to resist movement of said plunger towards said drainage outlet; and means for periodically rendering said last mentioned means ineffective including timing means driven by the compressed gas passing through said inlet; said plunger being provided with a pin extending through the slot in said cylindrical section to engage the same and unseat said valve member when said valve closing means is rendered ineffective.

9. A moisture separator of the class described comprising a casing having an inlet nozzle for compressed gas from which moisture is to be removed, an outlet for the gas from which moisture has been removed and a normally closed drainage outlet for the removed moisture, means driven directly by the pressure of the gas passing through said inlet nozzle, and means under the control of said last mentioned means for momentarily unclosing said drainage outlet at intervals determined by the amount of gas passing through said inlet nozzle.

References Cited in the file of this patent

UNITED STATES PATENTS

| 839,777 | Lloyd et al. | Dec. 25, 1906 |
| 1,581,636 | Hilger | Apr. 20, 1926 |

FOREIGN PATENTS

| 4,227 of 1888 | Great Britain | Mar. 19, 1888 |